US008284660B2

(12) United States Patent
Ulupinar et al.

(10) Patent No.: US 8,284,660 B2
(45) Date of Patent: Oct. 9, 2012

(54) METHOD AND APPARATUS FOR SCHEDULING OF QUALITY OF SERVICE (QOS) TRANSMISSIONS IN A WIRELESS COMMUNICATION SYSTEM

(75) Inventors: Fatih Ulupinar, San Diego, CA (US); Donald W. Gillies, San Diego, CA (US); Yousong Mei, San Diego, CA (US); Maksim Krasnyanskiy, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 371 days.

(21) Appl. No.: 12/610,146

(22) Filed: Oct. 30, 2009

(65) Prior Publication Data

US 2011/0103316 A1    May 5, 2011

(51) Int. Cl.
*H04L 12/56* (2006.01)
*H04J 1/00* (2006.01)

(52) U.S. Cl. ......... 370/230; 370/252; 370/412; 370/462

(58) Field of Classification Search .................. 370/252, 370/230, 412, 462
See application file for complete search history.

(56) References Cited

U.S. PATENT DOCUMENTS

| | | | |
|---|---|---|---|
| 6,198,724 B1 * | 3/2001 | Lam et al. ..................... | 370/233 |
| 6,788,687 B2 | 9/2004 | Bao et al. | |
| 2003/0156588 A1 * | 8/2003 | Elbourne et al. ......... | 370/395.41 |
| 2003/0223369 A1 * | 12/2003 | Anderson ..................... | 370/235 |
| 2003/0223445 A1 * | 12/2003 | Lodha ........................... | 370/412 |
| 2009/0067372 A1 | 3/2009 | Shah et al. | |

FOREIGN PATENT DOCUMENTS

EP          1328094 B1        4/2005

OTHER PUBLICATIONS

Andrews, et al. "QOS and Resource Allocation in the 3rd Generation Wireless Networks—Providing Quality of Service over a Shared Wireless Link." IEEE Communications Magazine, Feb. 2001, pp. 150-154, 0163-6804/01.

Bhatnagar, et al. "Providing Quality of Service Guarantees Using Only Edge Routers." Global Telecommunications Conference, 2001. pp. 2542-2548, vol. 4, San Antonio, Texas.

(Continued)

*Primary Examiner* — John Pezzlo
(74) *Attorney, Agent, or Firm* — William M. Hooks

(57) ABSTRACT

Scheduling real-time Quality of Service (QoS) data flows in a large-scale wireless communications system uses credit allocation to active QoS flows based on quality-of-service weights, and the credits are measured in dimensionless units of air interface slot capacity. Scheduling addresses inactive QoS flows with no data pending for transmission that may accumulate up to a burst credits limit based upon a fair share of all credits that would be allocated in a 100% busy system. Intermittent flows such as echo requests or keyboard input can thereby get immediate service by using their burst credits. The flow with the highest credit accumulation is serviced first and may use up to a full time slot (or system quanta) of air interface time reducing header encapsulation overhead when payload sizes (and spectral efficiency) are low. Additive and multiplicative aspects age the negative credits back to zero whenever a flow overspends its credit allocation.

44 Claims, 9 Drawing Sheets

OTHER PUBLICATIONS

Liu, et al. "A Fluid Analysis of a Utility-Based Wireless Scheduling Policy." Allerton Conference on Communications, Control, and Computing, 2002. Monticello, Illinois.

Andrews, Matthew. "Instability of the Proportional Fair Scheduling Algorithm for HDR." IEEE Transactions on Wireless Communications, Sep. 2004, vol. 3, Issue 5, pp. 1422-1426.

Andrews, et al. "Scheduling Over Non-Stationary Wireless Channels with Finite Rate Sets." IEEE INFOCOM 2004, Mar. 2004, Hong Kong, China.

Kim, et al. "An Efficient Scheduling Algorithm for QOS in Wireless Packet Data Transmission." The 13th IEEE International Symposium on Personal, Indoor and Mobile Radio Communications, 2002. Sep. 15-18, 2002. pp. 2244-2248. vol. 5.

Bennett, et al. "Hierarchical Packet Fair Queueing Algorithms." IEEE/ACM Transactions on Networking, Oct. 1997. pp. 675-689, vol. 5, Issue 5.

Demers, et al. "Analysis and Simulation of a Fair Queueing Algorithm." Applications, Technologies, Architectures, and Protocols for Computer Communication—Symposium proceedings on Communications architectures & protocols, Austin, Texas. 1989. pp. 1-12.

Dua, et al. "Downlink Scheduling of Heterogeneous Traffic." IEEE International Conference on Communications, Jun. 2006. pp. 5252-5257, vol. 11. Istanbul.

Dua, et al. "Deadline Constrained Packet Scheduling for Wireless Networks." IEEE 62nd Vehicular Technology Conference, 2005. pp. 196-200, vol. 1.

Dua, et al. "Wireless Packet Scheduling with Deadlines." IEEE Transactions on Mobile Computing, Dec. 2007. pp. 1410-1425, vol. 6, Issue 12.

Chiussi, et al. "Minimum-Delay Self-Clocked Fair Queueing Algorithm for Packet-Switched Networks." INFOCOM'98. Seventeenth Annual Joint Conference of the IEEE Computer and Communications Societies. 1998. vol. 3, pp. 1112-1121. San Francisco, California.

Goyal, et al. "A Hierarchical CPU Scheduler for Multimedia Operating Systems." Readings in Multimedia Computing and Networking Book Contents. 2001. pp. 491-505. Morgan Kaufmann Publishers Inc. San Francisco, California.

Agrawal, et al. "Joint Scheduling and Resource Allocation in CDMA Systems." 2nd Workshop on Modeling and Optimization in Mobile, Ad Hoc, and Wireless Networks (WiOpt '04), Mar. 24-26, 2004, Cambridge, United Kingdom.

Jain, Raj. "A Survey of Scheduling Methods." Presented at the Nokia Research Center, Boston, Massachusetts, Sep. 17, 1997. Published online at [http://www.cs.wustl.edu/~jain/talks/ftp/sched.pdf], retrieved on Jun. 23, 2009, 37 pages.

Shakkottai, et al. "Scheduling Algorithms for a Mixture of Real-Time and Non-Real-Time Data in HDR." In Proceedings of 17th International Teletraffic Congress (ITC-17), Salvador da Bahia, Brazil, 2001. pp. 793-804.

Shakkottai, et al. "Scheduling for multiple flows sharing a time-varying channel: The exponential rule." Analytic Methods in Applied Probability, 207:185-202, 2002.

Shakkottai, et al. "Scheduling Real-Time Traffic with Deadlines over a Wireless Channel." Proceedings of the 2nd ACM international workshop on Wireless mobile multimedia. 1999. pp. 35-42. Seattle, Washington.

Shreedhar, et al. "Efficient Fair Queuing Using Deficit Round-Robin." IEEE/ACM Transactions on Networking, Jun. 1996. pp. 375-385. vol. 4, No. 3.

Vaidya, et al. "Distributed Fair Scheduling in a Wireless LAN." IEEE Transactions on Mobile Computing, Nov.-Dec. 2005, pp. 616-629, vol. 4, Issue 6.

International Search Report and Written Opinion—PCT/US2010/054717, International Search Authority—European Patent Office—Mar. 1, 2011.

* cited by examiner

METHOD AND APPARATUS FOR SCHEDULING OF QUALITY OF SERVICE (QOS) TRANSMISSIONS IN A WIRELESS COMMUNICATION SYSTEM

BACKGROUND

1. Field

The present disclosure relates generally to communication and more specifically to techniques for scheduling and transmitting Quality of Service (QoS) data flows with fairness for a low priority, "bursty" data flow.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Traditionally, a Quality of Service (QoS) scheduling algorithm allows weights or priorities to be assigned to flows, so that the scheduler can give preference (in latency or throughput) to some flows over others. Algorithms such as weighted round-robin (WRR) or deficit round-robin (DRR) are two of the most common algorithms of this type.

In best-effort packet switching and other statistical multiplexing, round-robin scheduling can be used as an alternative to first-come first-serve queuing. A multiplexer, switch or router that provides round-robin scheduling has a separate queue for every data flow, where a data flow may be identified by its source and destination address. The algorithm lets every active data flow (that has data packets in queue) to take turns in transferring packets on a shared channel in a periodically repeated order. The scheduling is non-work conserving, meaning that if one flow is out of packets, the next data flow will take its place. Round-robin scheduling results in max-min fairness if the data packets are equally sized, since the data flow that has waited longest time is given scheduling priority. However, round-robin scheduling may not be desirable if the size of the jobs or tasks are strongly varying. A user that produces large jobs would be favored over other users. In that case fair queuing would be preferable.

If guaranteed or differentiated quality of service is offered, and not only best effort communication, deficit round robin (DRR) scheduling, weighted round robin (WRR) scheduling or weighted fair queuing (WFQ) may be considered.

In multiple access networks where several terminals are connected to a shared physical medium, round-robin scheduling may be provided by token passing channel access schemes such as token ring, as well as by polling or resource reservation from a central control station.

In a centralized wireless packet radio network, where many stations share one frequency channel, a scheduling algorithm in a central base station may reserve time slots for the mobile stations in a round-robin fashion and provide fairness. However, if link adaptation is used, it will take a much longer time to transmit a certain amount of data to "expensive" users than to others since the channel conditions differ. It would be more efficient to wait with the transmission until the channel conditions are improved, or at least to give scheduling priority to less expensive users. Round-robin scheduling does not utilize this. Higher throughput and system spectrum efficiency may be achieved by channel-dependent scheduling, for example, a proportionally fair algorithm, or maximum throughput scheduling. Note that the latter is characterized by undesirable scheduling starvation.

In an attempt to address this aspect, Weighted Round Robin (WRR) is a scheduling discipline. Each packet flow or connection has its own packet queue in a network interface. It is the simplest approximation of generalized processor sharing (GPS). While GPS serves infinitesimal amounts of data from each nonempty queue, WRR serves a number of packets for each nonempty queue: number=normalized (weight/mean_packet_size). As a weakness, to obtain a normalized set of weights that is required to approximate GPS, a mean packet size must be known. In IP networks with their variable packet size, the mean has to be estimated, which makes good GPS approximation hard to achieve in practice. Another weakness of WRR is that it cannot guarantee fair link sharing.

Deficit round robin (DRR), also deficit weighted round robin (DWRR), is a modified weighted round robin scheduling discipline that can handle packets of variable size without knowing their mean size. A maximum packet size number is subtracted from the packet length, and packets that exceed that number are held back until the next visit of the scheduler.

WRR serves every nonempty queue whereas DRR serves packets at the head of every nonempty queue having a deficit counter that is greater than the size of queued packet. Queues that have queued data that is lower than their corresponding deficit counter have their deficit counter increased by some given value called a quantum. Those queues that have queued packet smaller than the deficit counter can be transmitted with the deficit counter subsequently decreased by the size of packets being served.

While these scheduling approaches achieve a degree of fairness and network efficiency under certain situations, a terminal that tends to be idle for long periods of time suffers on those occasions when the terminal has a "burst" of data packets to send. A low priority "bursty" data flow can encounter long latency.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for scheduling the quality of service transmissions in a wireless communication system by employing a processor executing computer executable instructions stored on a computer readable storage medium to implement the following acts: A credit value is assigned to a data flow respectively for each user equipment (UE) of a population of UEs. Each data flow is scheduled having data to transmit based upon the assigned credit values. The credit value is reduced for each scheduled UE. The credit value is increased for each unscheduled UE having a respective data flow with no data to transmit.

In another aspect, a computer program product is provided for scheduling the quality of service transmissions in a wireless communication system. At least one computer readable storage medium stores computer executable instructions that when executed by at least one processor implement components. A first component assigns a credit value to a data flow respectively for each user equipment (UE) of a population of UEs. A second component schedules each data flow having data to transmit based upon the assigned credit values. A third component reduces the credit value for each scheduled UE and increases the credit value for each unscheduled UE having a respective data flow with no data to transmit.

In an additional aspect, an apparatus is provided for scheduling the quality of service transmissions in a wireless communication system. At least one computer readable storage medium stores computer executable instructions that when executed by at least one processor implement components. Means are provided for assigning a credit value to a data flow respectively for each user equipment (UE) of a population of UEs. Means are provided for scheduling each data flow having data to transmit based upon the assigned credit values. Means are provided for reducing the credit value for each scheduled UE and increasing the credit value for each unscheduled UE having a respective data flow with no data to transmit.

In a further aspect, an apparatus is provided for scheduling the quality of service transmissions in a wireless communication system. A receiver is for receiving requests for data flows to transmit data. A computing platform is for assigning a credit value to a data flow respectively for each user equipment (UE) of a population of UEs. A transmitter is for scheduling each data flow having data to transmit based upon the assigned credit values. The computing platform is further for reducing the credit value for each scheduled UE and increasing the credit value for each unscheduled UE having a respective data flow with no data to transmit.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Scheduling real-time Quality of Service (QoS) data flows in a large-scale wireless communications system uses credit allocating to active QoS flows based on assigned quality of service weights, and the credits are measured in dimensionless units of air interface slot capacity. Scheduling addresses inactive QoS flows with no data pending for transmission that may accumulate up to a burst credits limit based upon a fair share of all credits that would be allocated in a 100% busy system. Intermittent flows such as echo requests or keyboard input can thereby get immediate service by using their burst credits.

The flow with the highest credit accumulation is always serviced first. Whenever a flow is selected for service, it may use up to a full time slot (or system quanta) of air interface time. This policy is designed to reduce header encapsulation overhead when payload sizes (and spectral efficiency) are low. Because a flow may consume an entire time slot or system quanta, it may overspend its credit allocation, resulting in negative credits. Additive and multiplicative aspects are presented to age the negative credits back to zero whenever a flow overspends its credit allocation.

Alternately, a low-priority flow may be starved for a long time by a high-priority flow, resulting in excess credits for the low-priority flow. If all packets for the low-priority flow are transmitted, the credits for the low-priority flow are reset to the "burst credits" limit to maintain the invariant that idle flows accumulate no more than the "burst credits limit" for transmission.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
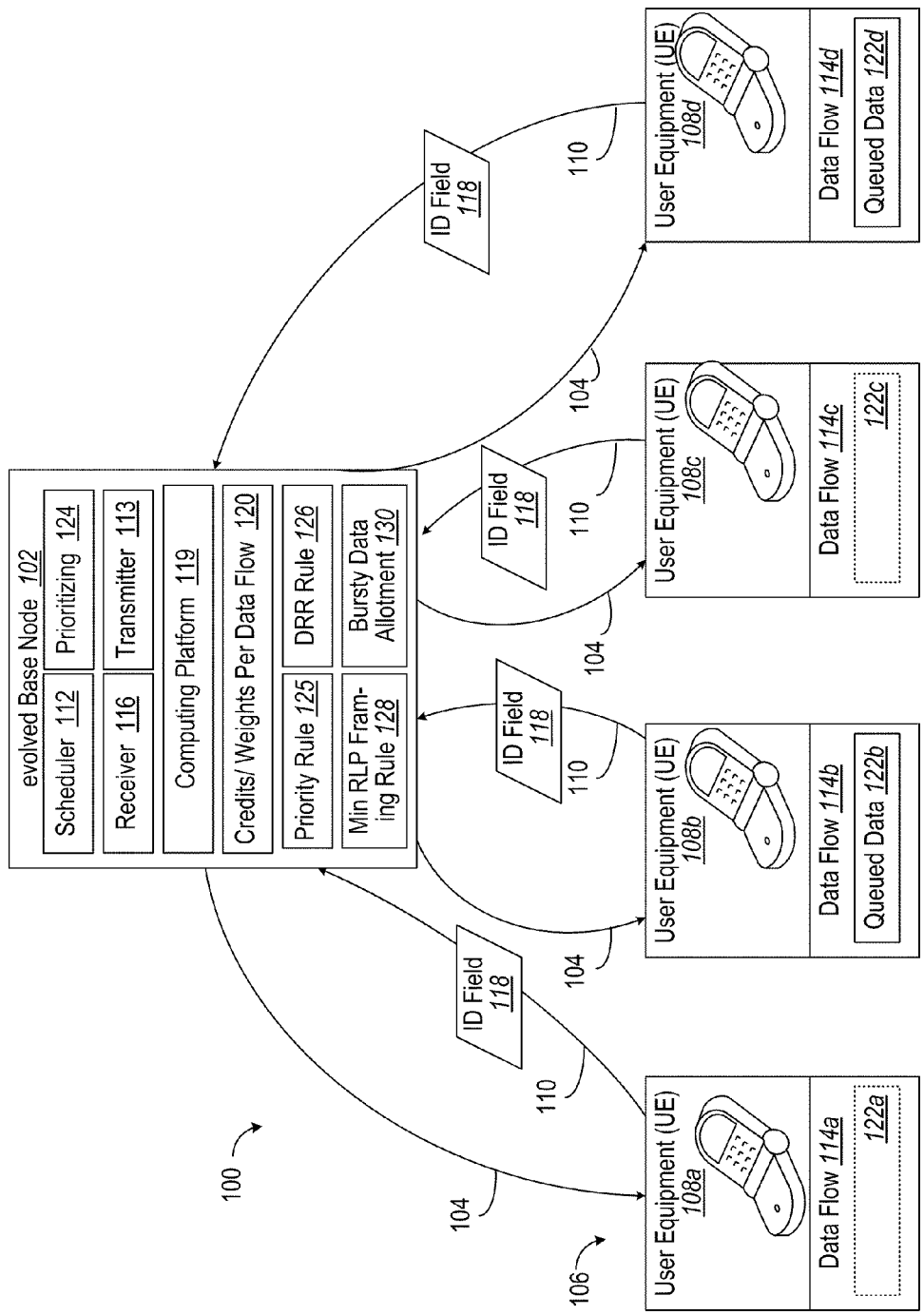
FIG. 1 depicts a block diagram of a wireless communication system in which the quality of service data flow transmissions are scheduled.

With reference to FIG. 1, a communication system 100 has a base station, such as an evolved Base Node (eNB) 102 that schedules on a downlink (DL) 104 a population 106 of an access terminal, mobile station or user equipment (UE) 108a-108d, for wireless (i.e., over-the-air) data packet communication on an uplink (UL) 110.

A scheduler 112 via a transmitter 113 assigns each data flow 114a-114d from respective UEs 108a-108d a weight for the appropriate quality of service (QoS). For instance, the weight is assigned during an admission control stage. Alternatively or in addition, the weight can be assigned statically by an administrator. A receiver 116 of the eNB 102 recognizes each data flow 114a-114d by one or more of a source port, destination port, source address, destination address, Internet Protocol (IP) Type of Service (TOS), etc., identifying field 118. In particular, the scheduler 112 causes a computing platform 119 to allocate credits 120 to each flow in every system slot or time quanta in response to recognizing each data flow. For instance, credits are allocated in units of Medium Access Control (MAC)-slot capacity, which is an advantageous way to describe channel capacity at any given time. For a flow that is active (i.e., data is queued as depicted at 122*b*, 122*d* for UEs 108*b*, 108*d*), credits are allotted in proportion to weight of this flow vs. sum-weight of all the other active flows 122*b*, 122*d*. For a data flow that is inactive (i.e., no data as depicted at 122*a*, 122*c*), credits 120 are allotted in proportion to weight of this flow vs. sum-weight of all flows (active and inactive) 114*a*-114*d*. The scheduler 112 causes a computing platform 119 to debit credits 120 from flows 122*b*, 122*d* in proportion to how much of a MAC slot that flow 122*b*, 122*d* consumed whenever a flow 122*b*, 122*d* is serviced.

In one aspect to enhance efficiency of the wireless communication system 100, the active flow 122*b* can implement a prioritizing component 124 with the highest number of credits that can be served first in accordance to a priority-driven rule 125. Alternatively or in addition, any active flow with positive credits may be served first in accordance with a deficit round robin rule 126. Advantageously, flows that are given service may consume up to a full MAC slot or quanta, even if this would cause their credits to go negative in accordance with a minimum RLP framing rule 128.

Although "bursty" UEs 108*a*, 108*c* are advantageously accorded credit for those periods in which they are idle, some constraints can avoid excessive build up of credits that would create other service issues. To that end, inactive data flows 114*a*, 114*c* are allowed to accumulate up to "bufferEmpty-Max" credits after which they accumulate no further credits in accordance to a bursty data allotment 130. Flows 114*b*, 114*d* that become inactive are similarly limited to "bufferEmpty-Max" credits.

Since flows 114*a*-114*d* can be allowed to exceed their available credits going negative in order to achieve efficient use of a MAC slot, it can be advantageous to not overly penalize such UEs 108*a*, 108*c*. In another aspect, the computing platform 119 allows a data flow 114*a*-114*d* to quickly return to zero credits after a certain number of inactive slots. For instance, negative credit counters can be set to zero after a predetermined number of slots (e.g., default: 1). In another instance, negative credit counters can be divided by a geometric factor (default: 2.0) or a polynomial factor increase (i.e., higher rate increases) of the credit value on every slot in addition to these methods the flow also receives a flow allocation based upon its weighting and based upon the fact that it has no data to send (e.g., divided the negative balance in half and then add the weight in relation to sum weighting of all flows).

Figure 2:
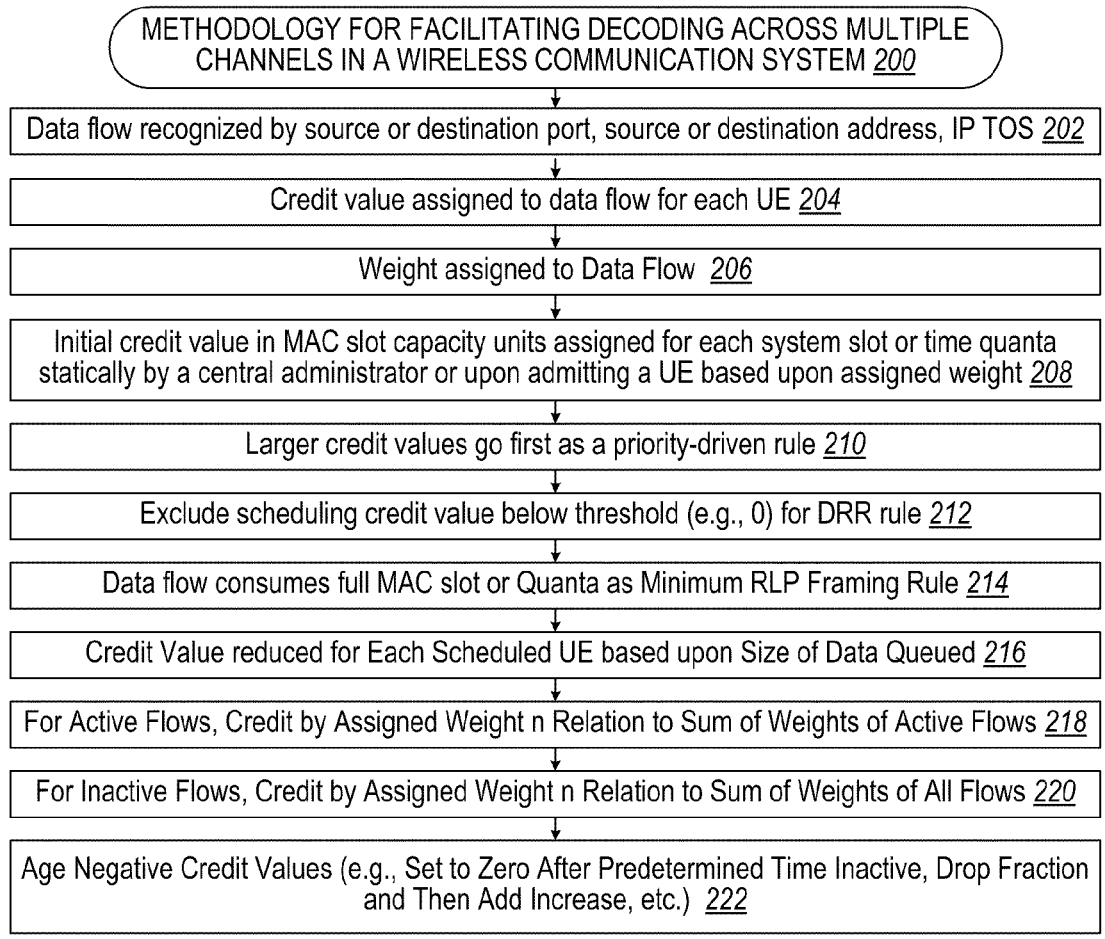
FIG. 2 depicts a flow diagram for a methodology or sequence of operations for scheduling the quality of service transmissions in a wireless communication system.

In FIG. 2, a methodology or sequence of operations 200 is provided for scheduling data flows for wireless data packet communication to accommodate quality of service with fairness for bursty UEs. Each data flow is recognized by a selected one of a group consisting of a source port, destination port, source address, destination address, and Internet Protocol (IP) Type of Service (TOS) field (block 202). A credit value is assigned to a data flow respectively for each user equipment (UE) of a population of UEs (block 204).

The credit can be associated with a "weight" assigning priority to a particular data flow, for instance to satisfy a contractual quality of service (QoS) given to a particular UE (block 206). The credit value in units of medium access control (MAC) slot capacity can be initially assigned to each data flow for each system slot or time quanta statically by a central administrator or upon admitting a UE to the wireless communication system based upon the assigned weight (block 208).

Each data flow having data to transmit is scheduled based upon the assigned credit values, in particular larger credit values go first (i.e., preceding) as a priority-driven rule (block 210). Alternatively or in addition, scheduling of any data flow having a credit value below a credit threshold (e.g., zero (0)) can be excluded as a deficit round robin rule (i.e., DRR excluding scheduling) (block 212). A data flow can consume a full medium access control (MAC) slot or quanta as a minimum radio link protocol (RLP) framing rule for more efficient network utilization (block 214).

The credit value is reduced for each scheduled UE based upon a size of scheduled data queued (block 216). These credit values can be made in proportion to the assigned weight in relation to a sum of weights of other scheduled data flows (block 218). For unscheduled flows, the increase to the credit value for a subsequent system slot or time quanta can be made in proportion to the assigned weight in relation to a sum of all weights of other scheduled and unscheduled data flows to no more than a maximum credit allotment. (block 220)

Since RLP framing can result in a negative credit value for a "bursty" UE, the negative credit value can be aged more quickly than just with the usual increase since going negative was to the benefit of the system (e.g., set to zero after a predefined period of time, drop a fraction of the negative balance and then add increase) (block 222).

Figure 3:
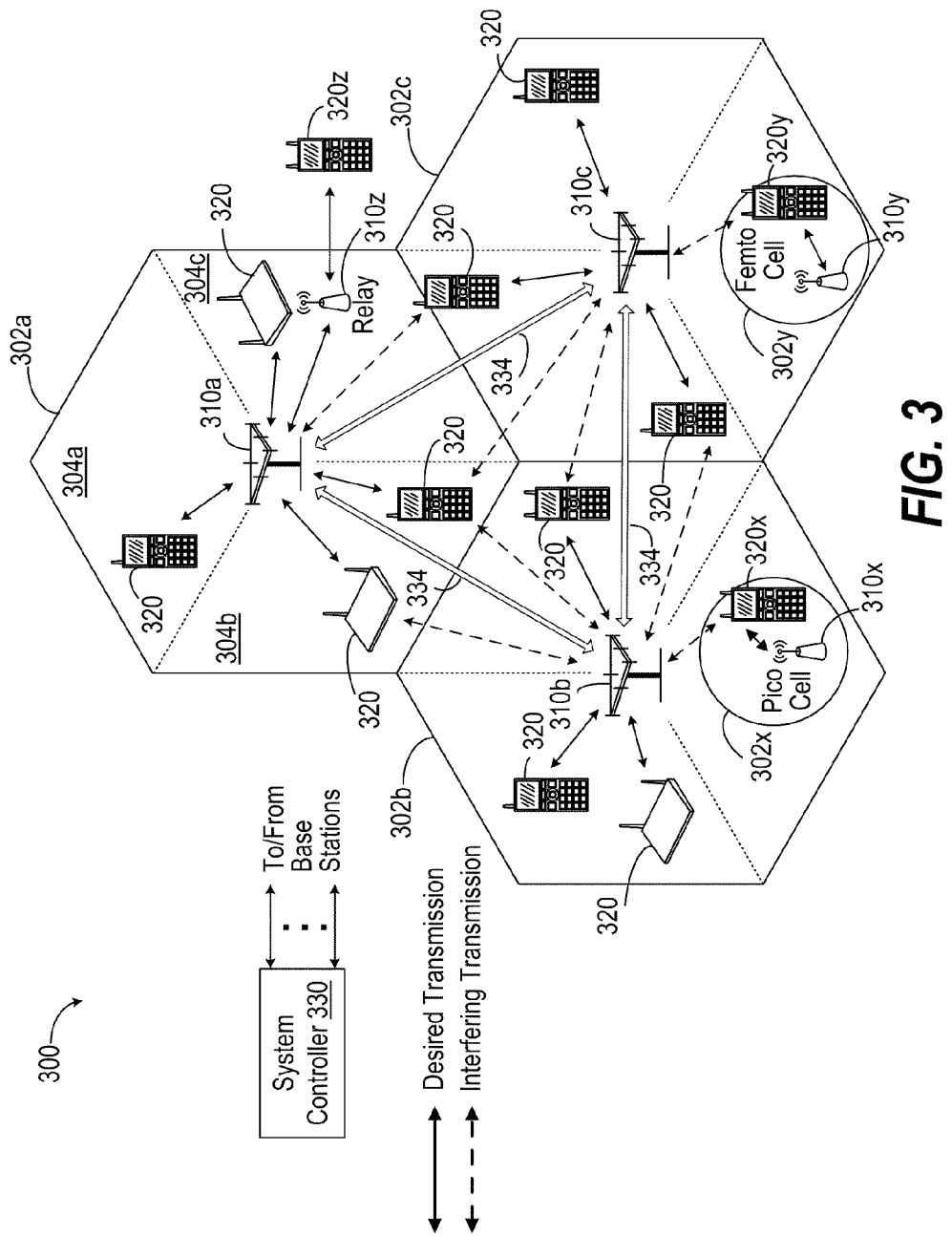
FIG. 3 depicts a block diagram of base stations serving and interfering with a population of terminals.

In the example shown in FIG. 3, base stations 310*a*, 310*b* and 310*c* may be macro base stations for macro cells 302*a*, 302*b* and 302*c*, respectively. Base station 310*x* may be a pico base station for a pico cell 302*x* communicating with terminal 320*x*. Base station 310*y* may be a femto base station for a femto cell 302*y* communicating with terminal 320*y*. Although not shown in FIG. 3 for simplicity, the macro cells may overlap at the edges. The pico and femto cells may be located within the macro cells (as shown in FIG. 3) or may overlap with macro cells and/or other cells.

Wireless network 300 may also include relay stations, e.g., a relay station 310*z* that communicates with terminal 320*z*. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 330 may couple to a set of base stations and provide coordination and control for these base stations. Network controller 330 may be a single network entity or a collection of network entities. Network controller 330 may communicate with base stations 310 via a backhaul. Backhaul network communication 334 can facilitate point-to-point communication between base stations 310*a*-310*c* employing such a distributed architecture. Base stations 310*a*-310*c* may also communicate with one another, e.g., directly or indirectly via wireless or wireline backhaul.

Wireless network 300 may be a homogeneous network that includes only macro base stations (not shown in FIG. 3). Wireless network 300 may also be a heterogeneous network that includes base stations of different types, e.g., macro base stations, pico base stations, home base stations, relay stations, etc. These different types of base stations may have different transmit power levels, different coverage areas, and a different impact on interference in wireless network 300. For example, macro base stations may have a high transmit power level (e.g., 20 Watts) whereas pico and femto base stations may have a low transmit power level (e.g., 3 Watts). The techniques described herein may be used for homogeneous and heterogeneous networks.

Terminals 320 may be dispersed throughout wireless network 300, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 3, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 300 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as a Global Positioning System (GPS).

In one aspect, to improve system capacity, the coverage area 302a, 302b, or 302c corresponding to a respective base station 310a-310c can be partitioned into multiple smaller areas (e.g., areas 304a, 304b, and 304c). Each of the smaller areas 304a, 304b, and 304c can be served by a respective base transceiver subsystem (BTS, not shown). As used herein and generally in the art, the term "sector" can refer to a BTS and/or its coverage area depending on the context in which the term is used. In one example, sectors 304a, 304b, 304c in a cell 302a, 302b, 302c can be formed by groups of antennas (not shown) at base station 310, where each group of antennas is responsible for communication with terminals 320 in a portion of the cell 302a, 302b, or 302c. For example, a base station 310 serving cell 302a can have a first antenna group corresponding to sector 304a, a second antenna group corresponding to sector 304b, and a third antenna group corresponding to sector 304c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 4:
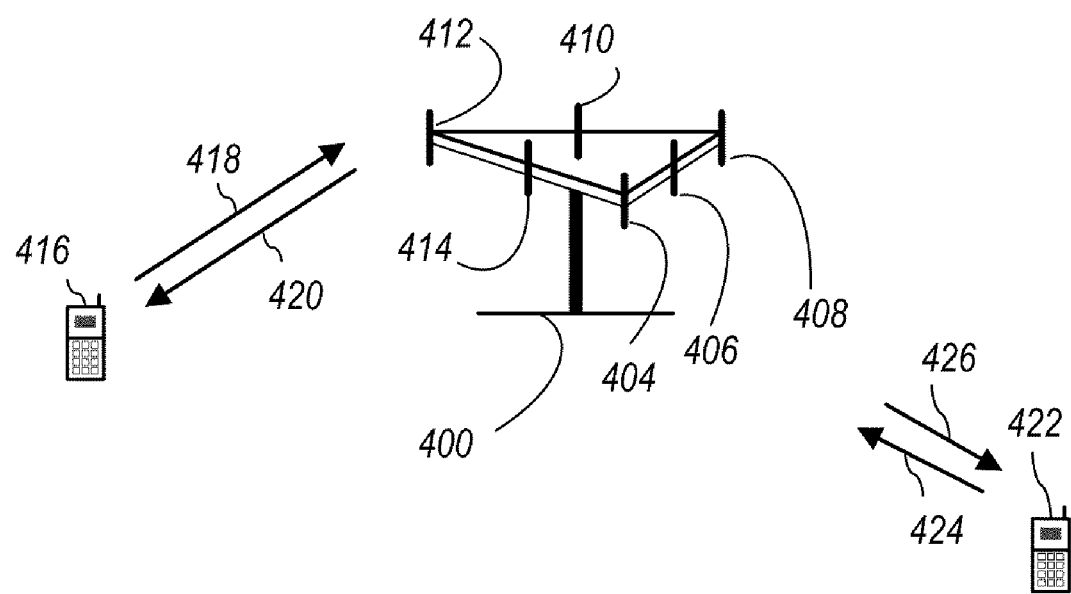
FIG. 4 depicts a block diagram of a multiple access wireless communication system.

Referring to FIG. 4, a multiple access wireless communication system according to one embodiment is illustrated. An access point (AP) 400 includes multiple antenna groups, one including 404 and 406, another including 408 and 410, and an additional including 412 and 414. In FIG. 4, only two antennas are shown for each antenna group, however, more or fewer antennas may be utilized for each antenna group. Access terminal (AT) 416 is in communication with antennas 412 and 414, where antennas 412 and 414 transmit information to access terminal 416 over forward link 420 and receive information from access terminal 416 over reverse link 418. Access terminal 422 is in communication with antennas 406 and 408, where antennas 406 and 408 transmit information to access terminal 422 over forward link 426 and receive information from access terminal 422 over reverse link 424. In a FDD system, communication links 418, 420, 424 and 426 may use different frequency for communication. For example, forward link 420 may use a different frequency then that used by reverse link 418.

Each group of antennas and/or the area in which they are designed to communicate is often referred to as a sector of the access point. In the aspect, antenna groups each are designed to communicate to access terminals in a sector, of the areas covered by access point 400.

In communication over forward links 420 and 426, the transmitting antennas of access point 400 utilize beamforming in order to improve the signal-to-noise ratio of forward links for the different access terminals 416 and 422. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called user equipment (UE), a wireless communication device, terminal, or some other terminology.

Figure 5:
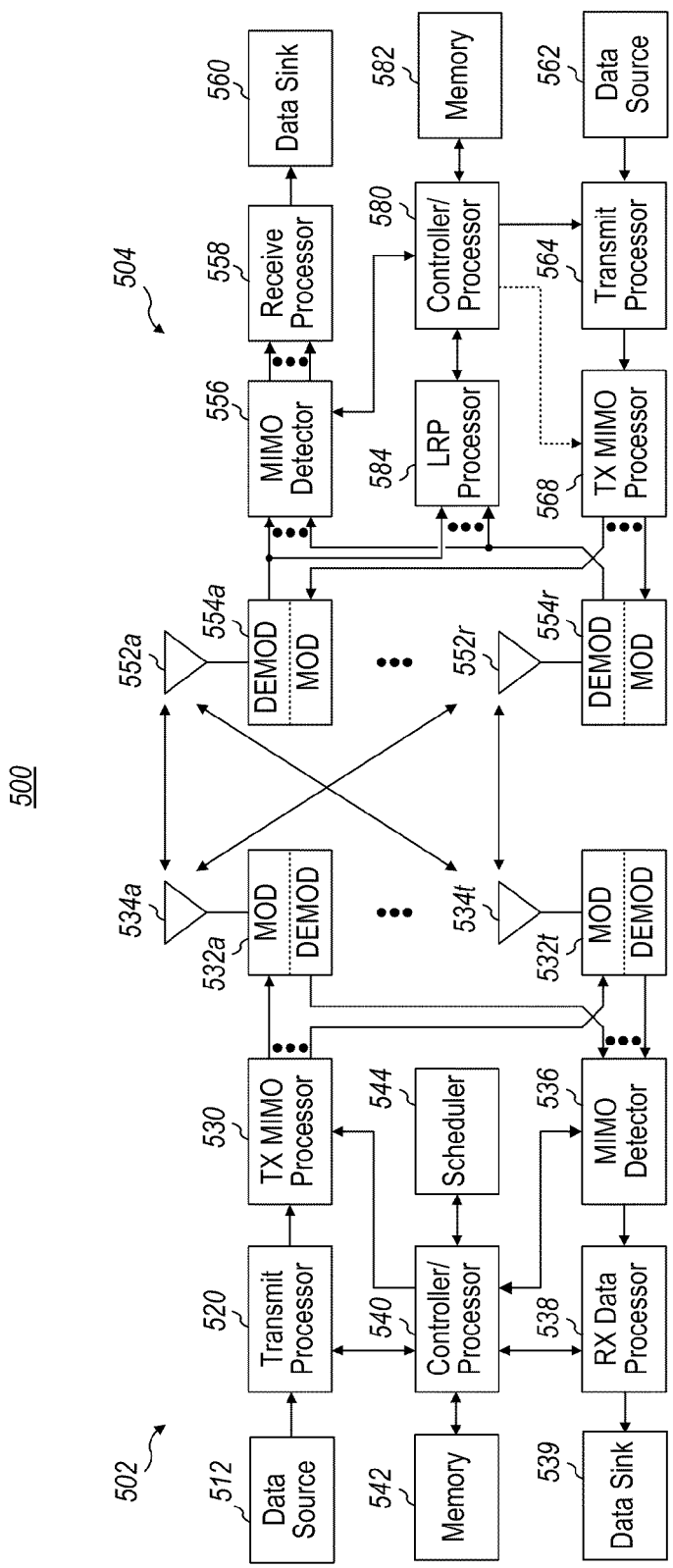
FIG. 5 depicts a block diagram of a communication system between a base station and a terminal.

FIG. 5 shows a block diagram of a design of a communication system 500 between a base station 502 and a terminal 504, which may be one of the base stations and one of the terminals in FIG. 1. Base station 502 may be equipped with TX antennas 534a through 534t, and terminal 504 may be equipped with RX antennas 552a through 552r, where in general $T \geq 1$ and $R \geq 1$.

At base station 502, a transmit processor 520 may receive traffic data from a data source 512 and messages from a controller/processor 540. Transmit processor 520 may process (e.g., encode, interleave, and modulate) the traffic data and messages and provide data symbols and control symbols, respectively. Transmit processor 520 may also generate pilot symbols and data symbols for a low reuse preamble and pilot symbols for other pilots and/or reference signals. A transmit (TX) multiple-input multiple-output (MIMO) processor 530 may perform spatial processing (e.g., precoding) on the data symbols, the control symbols, and/or the pilot symbols, if applicable, and may provide T output symbol streams to T modulators (MODs) 532a through 532t. Each modulator 532 may process a respective output symbol stream (e.g., for OFDM, SC-FDM, etc.) to obtain an output sample stream.

Each modulator 532 may further process (e.g., convert to analog, amplify, filter, and upconvert) the output sample stream to obtain a downlink signal. T downlink signals from modulators 532a through 532t may be transmitted via T antennas 534a through 534t, respectively.

At terminal 504, antennas 552a through 552r may receive the downlink signals from base station 502 and may provide received signals to demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, SC-FDM, etc.) to obtain received symbols. A MIMO detector 556 may obtain received symbols from all R demodulators 554a through 554r, perform MIMO detection on the received symbols if applicable, and provide detected symbols. A receive processor 558 may process (e.g., demodulate, deinterleave, and decode) the detected symbols, provide decoded traffic data for terminal 504 to a data sink 560, and provide decoded messages to a controller/processor 580. A low reuse preamble (LRP) processor 584 may detect for low reuse preambles from base stations and provide information for detected base stations or cells to controller/processor 580.

On the uplink, at terminal 504, a transmit processor 564 may receive and process traffic data from a data source 562 and messages from controller/processor 580. The symbols from transmit processor 564 may be precoded by a TX MIMO processor 568 if applicable, further processed by modulators 554a through 554r, and transmitted to base station 502. At base station 502, the uplink signals from terminal 504 may be received by antennas 534, processed by demodulators 532, detected by a MIMO detector 536 if applicable, and further processed by a receive data processor 538 to obtain the decoded packets and messages transmitted by terminal 504 for providing to a data sink 539.

Controllers/processors 540 and 580 may direct the operation at base station 502 and terminal 504, respectively. Processor 540 and/or other processors and modules at base station 502 may perform or direct processes for the techniques described herein. Processor 584 and/or other processors and modules at terminal 504 may perform or direct processes for the techniques described herein. Memories 542 and 582 may store data and program codes (i.e., storing operation) for base station 502 and terminal 504, respectively. A scheduler 544 may schedule terminals for data transmission on the downlink and/or uplink and may provide resource grants for the scheduled terminals.

Figure 6A:
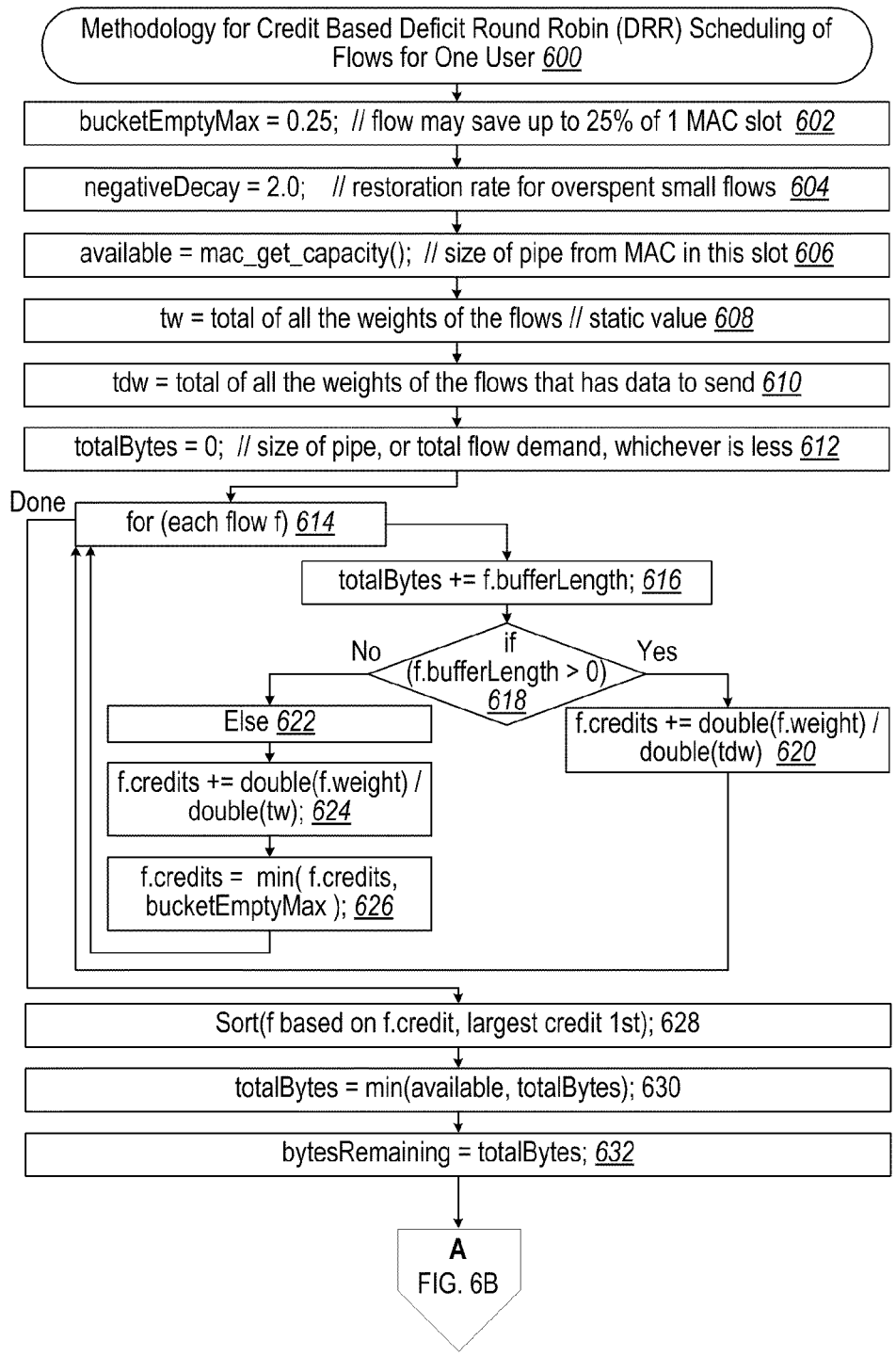
FIGS. 6A-6B depicts a block diagram of a communication system to enable deployment of access point base stations within a network environment.
Figure 6B:
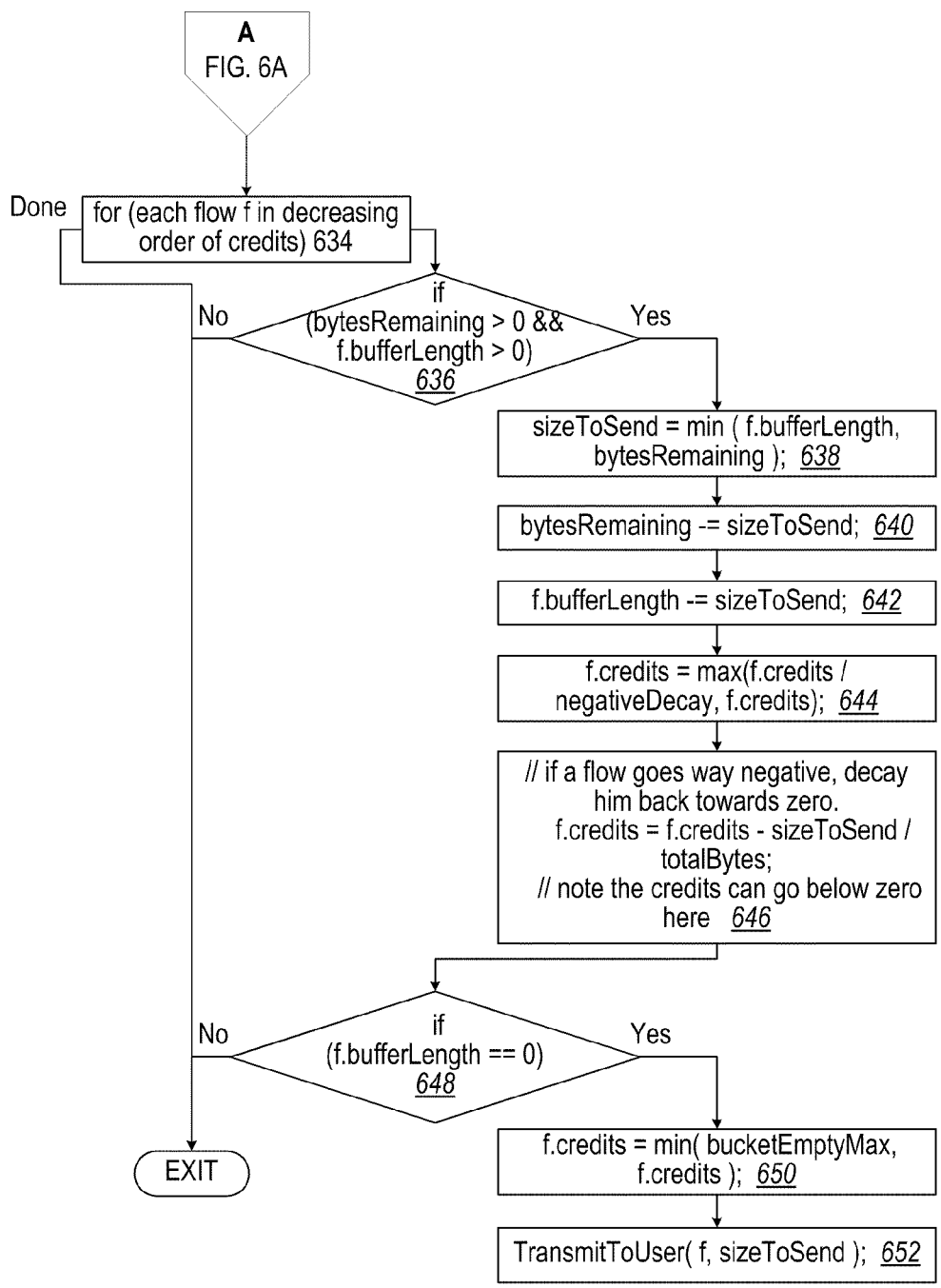

In FIGS. 6A-6B, an exemplary scheduling algorithm 600 is provided for credit based Deficit Round Robin (DRR) scheduling of flows for one user.

```
bucketEmptyMax = 0.25; // flow may save up to 25% of 1 MAC slot.
(block 602).
negativeDecay = 2.0; // restoration rate for overspent small flows. (block 604)
available = mac__get__capacity( ); // size of pipe from MAC in this slot.
(block 606)
tw = total of all the weights of the flows;        // static value (block 608)
tdw = total of all the weights of the flows that has data to send; (block 610)
totalBytes = 0; // size of pipe, or total flow demand, whichever is less.
(block 612)
for (each flow f) (block 614)
{
    totalBytes += f.bufferLength; (block 616)
    if (f.bufferLength > 0) (block 618)
    {
```

-continued

```
        f.credits += f.weight / tdw; (block 620)
    }
    else (block 622)
    {
        f.credits += f.weight / tw; (block 624)
        f.credits = min( f.credits, bucketEmptyMax ); (block 626)
    }
}
Sort(f based on f.credit, largest credit 1st); (block 628)
totalBytes = min(available, totalBytes); (block 630)
bytesRemaining = totalBytes; (block 632)
for (each flow f in decreasing order of credits) (block 634)
{
    if (bytesRemaining > 0 && f.bufferLength > 0) (block 636)
    {
        sizeToSend = min ( f.bufferLength, bytesRemaining );
        (block 638)
        bytesRemaining -= sizeToSend; (block 640)
        f.bufferLength -= sizeToSend; (block 642)
        f.credits = max(f.credits / negativeDecay, f.credits); (block 644)
        // if a flow goes way negative, decay him back towards zero.
            f.credits = f.credits - sizeToSend / totalBytes;
        // note the credits can go below zero here (block 646)
        if (f.bufferLength == 0) (block 648)
        {
            f.credits = min( bucketEmptyMax, f.credits ); (block 650)
        }
        TransmitToUser( f, sizeToSend ); (block 652)
    }
}
```

Figure 7:
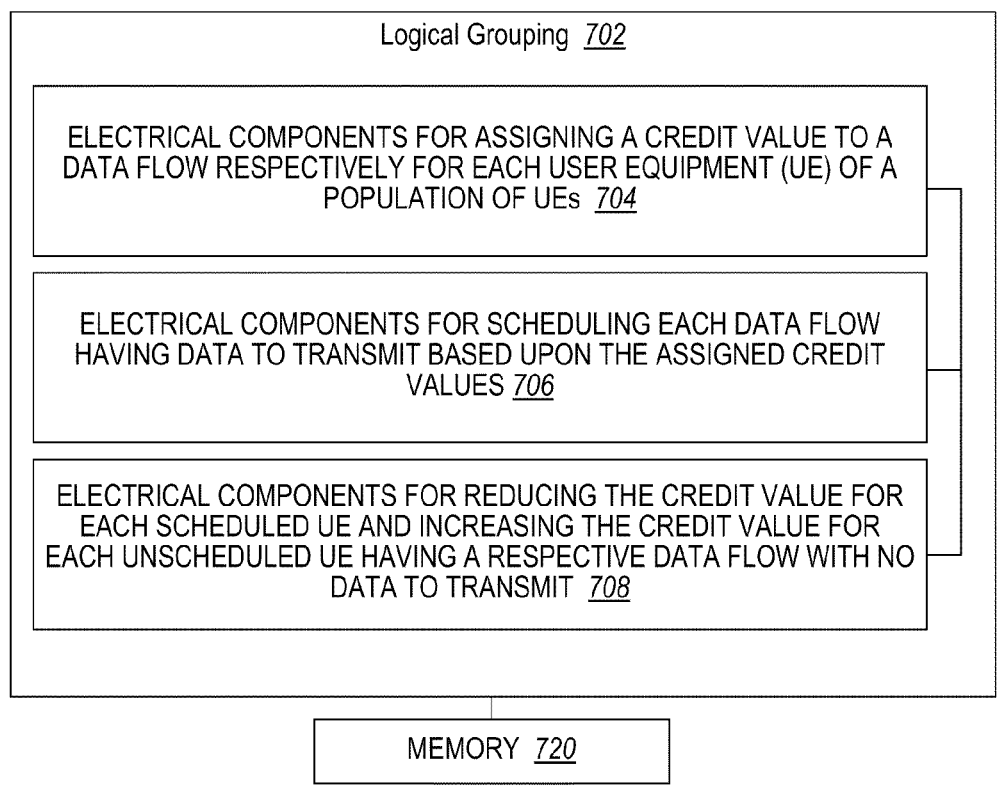
FIG. 7 depicts a block diagram for a system containing logical groupings of electrical components for scheduling the quality of service transmissions in a wireless communication system.

With reference to FIG. 7, illustrated is a system 700 for scheduling quality of service transmissions in a wireless communication system. For example, system 700 can reside at least partially within a base station. It is to be appreciated that system 700 is represented as including functional blocks, which can be functional blocks that represent functions implemented by a computing platform, processor, software, or combination thereof (e.g., firmware). System 700 includes a logical grouping 702 of electrical components that can act in conjunction. For instance, logical grouping 702 can include an electrical component for assigning a credit value to a data flow respectively for each user equipment (UE) of a population of UEs 704. Moreover, logical grouping 702 can include an electrical component for scheduling each data flow having data to transmit based upon the assigned credit values 706. Further, logical grouping 702 can include an electrical component for reducing the credit value for each scheduled UE and increasing the credit value for each unscheduled UE having a respective data flow with no data to transmit 708. Additionally, system 700 can include a memory 720 that retains instructions for executing functions associated with electrical components 704-708. While shown as being external to memory 720, it is to be understood that one or more of electrical components 704-708 can exist within memory 720.

Figure 8:
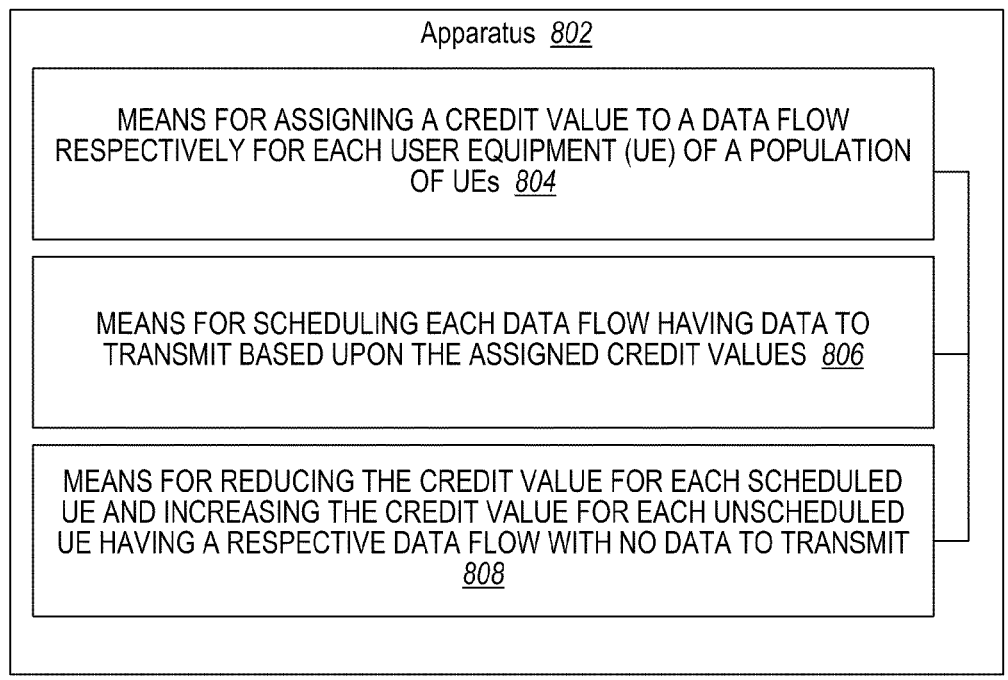
FIG. 8 depicts a block diagram for an apparatus having means for scheduling the quality of service transmissions in a wireless communication system.

With reference to FIG. 8, an apparatus 802 is provided for scheduling quality of service transmissions in a wireless communication system. Means 804 are provided for assigning a credit value to a data flow respectively for each user equipment (UE) of a population of UEs. Means 806 are provided for scheduling each data flow having data to transmit based upon the assigned credit values. Means 808 are provided for reducing the credit value for each scheduled UE and increasing the credit value for each unscheduled UE having a respective data flow with no data to transmit.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for scheduling quality of service transmissions in a wireless communication system, comprising:
    employing a processor executing computer executable instructions stored on a non-transitory computer readable storage medium to implement following acts:
    assigning a credit value to a data flow respectively for each user equipment (UE) of a population of user equipment (UE);
    scheduling each data flow having data to transmit based upon the respective credit values; and
    reducing the credit value for a scheduled user equipment (UE) and increasing the credit value for an unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system.

2. The method of claim 1, further comprising:
    assigning a quality-of-service weight to the data flow for each user equipment (UE); and
    assigning the credit value initially to each data flow based upon a total of the quality-of-service weights.

3. The method of claim 2, further comprising reducing the credit value based upon a size of scheduled data queued for the user equipment (UE).

4. The method of claim 1, further comprising increasing the credit value for an unscheduled data flow for the user equipment (UE) to no more than a maximum credit allotment.

5. The method of claim 1, further comprising assigning credits for each system slot or time quanta.

6. The method of claim 1, further comprising assigning the credit value upon admitting a user equipment (UE) to the wireless communication system.

7. A method for scheduling quality of service transmissions in a wireless communication system, comprising:
    employing a processor executing computer executable instructions stored on a non-transitory computer readable storage medium to implement the following acts:
    assigning a credit value to a data flow respectively for each user equipment (UE) of a population of user equipment (UE);
    scheduling each data flow having data to transmit based upon the respective credit values; reducing the credit value for a scheduled user equipment (UE) and increasing the credit value for an unscheduled user equipment (UE) having a respective data flow with no data to transmit;
    assigning a quality of service weight to the data flow for each user equipment (UE);
    assigning the credit value initially to each data flow based upon a total of the quality of service weights; and
    allocating to the credit value for a subsequent system slot or time quanta for a scheduled data flow in proportion to the quality-of-service weight in relation to a sum of weights of other scheduled data flows.

8. A method for scheduling quality of service transmissions in a wireless communication system, comprising:
    employing a processor executing computer executable instructions stored on a non-transitory computer readable storage medium to implement the following acts:
    assigning a credit value to a data flow respectively for each user equipment (UE) of a population of user equipment (UE);
    scheduling each data flow having data to transmit based upon the respective credit values;
    reducing the credit value for a scheduled user equipment (UE) and increasing the credit value for an unscheduled user equipment (UE) having a respective data flow with no data to transmit;
    assigning a quality of service weight to the data flow for each user equipment (UE);
    assigning the credit value initially to each data flow based upon a total of the quality of service weights; and
    allocating to the credit value for a subsequent system slot or time quanta for an unscheduled data flow in proportion to the quality-of-service weight in relation to a sum of all weights of other scheduled and unscheduled data flows.

9. A method for scheduling quality of service transmissions in a wireless communication system, comprising:
    employing a processor executing computer executable instructions stored on a non-transitory computer readable storage medium to implement the following acts:
    assigning a credit value to a data flow respectively for each user equipment (UE) of a population of user equipment (UE);
    scheduling each data flow having data to transmit based upon the respective credit values;
    reducing the credit value for a scheduled user equipment (UE) and increasing the credit value for an unscheduled user equipment (UE) having a respective data flow with no data to transmit;
    assigning a quality of service weight to the data flow for each user equipment (UE);
    assigning the credit value initially to each data flow based upon a total of the quality of service weights; and
    assigning the credit value initially based upon the quality-of-service weights in relation to a total of the quality-of-service weights of scheduled data flows.

10. A method for scheduling quality of service transmissions in a wireless communication system, comprising:
    employing a processor executing computer executable instructions stored on a non-transitory computer readable storage medium to implement the following acts:
    assigning a credit value to a data flow respectively for each user equipment (UE) of a population of user equipment (UE);
    scheduling each data flow having data to transmit based upon the respective credit values;
    reducing the credit value for a scheduled user equipment (UE) and increasing the credit value for an unscheduled user equipment (UE) having a respective data flow with no data to transmit; and
    scheduling a data flow to transmit data having a size that will reduce the credit value corresponding to the data flow below zero.

11. A method for scheduling quality of service transmissions in a wireless communication system, comprising:
    employing a processor executing computer executable instructions stored on a non-transitory computer readable storage medium to implement the following acts:
    assigning a credit value to a data flow respectively for each user equipment (UE) of a population of user equipment (UE);

scheduling each data flow having data to transmit based upon the respective credit values;
reducing the credit value for a scheduled user equipment (UE) and increasing the credit value for an unscheduled user equipment (UE) having a respective data flow with no data to transmit;
scheduling a data flow to transmit data having a size that will reduce the credit value corresponding to the data flow below zero; and
scheduling a data flow to consume a full medium access control (MAC) slot or quanta as a minimum radio link protocol (RLP) framing rule.

12. A method for scheduling quality of service transmissions in a wireless communication system, comprising:
employing a processor executing computer executable instructions stored on a non-transitory computer readable storage medium to implement the following acts:
assigning a credit value to a data flow respectively for each user equipment (UE) of a population of user equipment (UE);
scheduling each data flow having data to transmit based upon the respective credit values;
reducing the credit value for a scheduled user equipment (UE) and increasing the credit value for an unscheduled user equipment (UE) having a respective data flow with no data to transmit; and
scheduling a data flow to transmit data having a size that will reduce the credit value corresponding to the data flow below zero; and
increasing the credit value for user equipment (UE) having a credit value below zero at a rate higher than increases for an unscheduled data queue for the user equipment (UE) having a credit value above zero.

13. A method for scheduling quality of service transmissions in a wireless communication system, comprising:
employing a processor executing computer executable instructions stored on a non-transitory computer readable storage medium to implement the following acts:
assigning a credit value to a data flow respectively for each user equipment (UE) of a population of user equipment (UE);
scheduling each data flow having data to transmit based upon the respective credit values;
reducing the credit value for a scheduled user equipment (UE) and increasing the credit value for an unscheduled user equipment (UE) having a respective data flow with no data to transmit;
scheduling a data flow to transmit data having a size that will reduce the credit value corresponding to the data flow below zero;
increasing the credit value for user equipment (UE) having a credit value below zero at a rate higher than increases for an unscheduled data queue for the user equipment (UE) having a credit value above zero; and
increasing the credit value for user equipment (UE) having a credit value below zero by increasing the credit value to zero after a predefined period of time.

14. A method for scheduling quality of service transmissions in a wireless communication system, comprising:
employing a processor executing computer executable instructions stored on a non-transitory computer readable storage medium to implement the following acts:
assigning a credit value to a data flow respectively for each user equipment (UE) of a population of user equipment (UE);
scheduling each data flow having data to transmit based upon the respective credit values;
reducing the credit value for a scheduled user equipment (UE) and increasing the credit value for an unscheduled user equipment (UE) having a respective data flow with no data to transmit;
scheduling a data flow to transmit data having a size that will reduce the credit value corresponding to the data flow below zero;
increasing the credit value for user equipment (UE) having a credit value below zero at a rate higher than increases for an unscheduled data queue for the user equipment (UE) having a credit value above zero; and
increasing the credit value for user equipment (UE) having a credit value below zero by increasing the credit value by a geometric factor.

15. A method for scheduling quality of service transmissions in a wireless communication system, comprising:
employing a processor executing computer executable instructions stored on a non-transitory computer readable storage medium to implement the following acts:
assigning a credit value to a data flow respectively for each user equipment (UE) of a population of user equipment (UE);
scheduling each data flow having data to transmit based upon the respective credit values;
reducing the credit value for a scheduled user equipment (UE) and increasing the credit value for an unscheduled user equipment (UE) having a respective data flow with no data to transmit;
scheduling a data flow to transmit data having a size that will reduce the credit value corresponding to the data flow below zero;
increasing the credit value for user equipment (UE) having a credit value below zero at a rate higher than increases for an unscheduled data queue for the user equipment (UE) having a credit value above zero; and
increasing the credit value for user equipment (UE) having a credit value below zero by increasing the credit value by a polynomial factor.

16. A method for scheduling quality of service transmissions in a wireless communication system, comprising:
employing a processor executing computer executable instructions stored on a non-transitory computer readable storage medium to implement following acts:
assigning a credit value to a data flow respectively for each user equipment (UE) of a population of user equipment (UE);
scheduling each data flow having data to transmit based upon the respective credit values; and
reducing the credit value for a scheduled user equipment (UE) and increasing the credit value for an unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system; and
scheduling each data flow having data based on having a credit value that is larger as a priority-driven rule.

17. A method for scheduling quality of service transmissions in a wireless communication system, comprising:
employing a processor executing computer executable instructions stored on a non-transitory computer readable storage medium to implement following acts:
assigning a credit value to a data flow respectively for each user equipment (UE) of a population of user equipment (UE);

scheduling each data flow having data to transmit based upon the respective credit values; and reducing the credit value for a scheduled user equipment (UE) and increasing the credit value for an unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system; and excluding scheduling of any data flow having a credit value below a credit threshold as a deficit round robin rule.

18. A method for scheduling quality of service transmissions in a wireless communication system, comprising:

employing a processor executing computer executable instructions stored on a non-transitory computer readable storage medium to implement following acts:

assigning a credit value to a data flow respectively for each user equipment (UE) of a population of user equipment (UE);

scheduling each data flow having data to transmit based upon the respective credit values; and reducing the credit value for a scheduled user equipment (UE) and increasing the credit value for an unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system; and excluding scheduling of any data flow having a credit value below a credit threshold as a deficit round robin rule, wherein the credit threshold is zero.

19. A method for scheduling quality of service transmissions in a wireless communication system, comprising:

employing a processor executing computer executable instructions stored on a non-transitory computer readable storage medium to implement following acts:

assigning a credit value to a data flow respectively for each user equipment (UE) of a population of user equipment (UE);

scheduling each data flow having data to transmit based upon the respective credit values; and reducing the credit value for a scheduled user equipment (UE) and increasing the credit value for an unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system; and assigning the credit value statically by a central administrator.

20. A method for scheduling quality of service transmissions in a wireless communication system, comprising:

employing a processor executing computer executable instructions stored on a non-transitory computer readable storage medium to implement following acts:

assigning a credit value to a data flow respectively for each user equipment (UE) of a population of user equipment (UE);

scheduling each data flow having data to transmit based upon the respective credit values; and reducing the credit value for a scheduled user equipment (UE) and increasing the credit value for an unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system; and recognizing each data flow by a selected one of a group consisting of upon source port, destination port, source address, destination address, and Internet Protocol (IP) Type of Service (TOS) field.

21. A method for scheduling quality of service transmissions in a wireless communication system, comprising:

employing a processor executing computer executable instructions stored on a non-transitory computer readable storage medium to implement following acts:

assigning a credit value to a data flow respectively for each user equipment (UE) of a population of user equipment (UE);

scheduling each data flow having data to transmit based upon the respective credit values; and reducing the credit value for a scheduled user equipment (UE) and increasing the credit value for an unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system; and assigning credits in units of medium access control (MAC) slot capacity.

22. A computer program product for scheduling quality of service transmissions in a wireless communication system, comprising:

at least one non-transitory computer readable storage medium storing computer executable instructions that when executed by at least one processor implement components comprising:

a first component for assigning a credit value to a data flow respectively for each user equipment (UE) of a population of user equipment (UE);

a second component for scheduling each data flow having data to transmit based upon the respective credit value; and a third component for reducing the credit value for a scheduled user equipment (UE) and increasing the credit value for an unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system.

23. An apparatus for scheduling quality of service transmissions in a wireless communication system, comprising:

at least one processor;

at least one non-transitory computer readable storage medium storing computer executable instructions that when executed by the at least one processor implement components comprising:

means for assigning a credit value to a data flow respectively for each user equipment (UE) of a population of user equipment (UE);

means for scheduling each data flow having data to transmit based upon the assigned credit values; and means for reducing the credit value for each scheduled user equipment (UE) and increasing the credit value for each unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system.

24. An apparatus for scheduling quality of service transmissions in a wireless communication system, comprising:
a receiver for receiving requests for data flows to transmit data;
a computing platform for assigning a credit value to a data flow respectively for each user equipment (UE) of a population of user equipment (UE);
a transmitter for scheduling each data flow having data to transmit based upon the assigned credit values; and
the computing platform further for reducing the credit value for each scheduled user equipment (UE) and increasing the credit value for each unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system.

25. The apparatus of claim 24, wherein the computing platform is further for assigning a quality-of-service weight to the data flow for each user equipment (UE) and for assigning the credit value initially to each data flow based upon a total of quality-of-service weights.

26. The apparatus of claim 25, wherein the computing platform is further for reducing the credit value based upon a size of scheduled data queued for the scheduled user equipment (UE).

27. The apparatus of claim 24, wherein the computing platform is further for increasing the credit value for each unscheduled user equipment (UE) to no more than a maximum credit allotment.

28. The apparatus of claim 24, wherein the computing platform is further for assigning credits for each system slot or time quanta.

29. The apparatus of claim 24, wherein the computing platform is further for assigning the credit value upon admitting a user equipment (UE) to the wireless communication system.

30. An apparatus for scheduling quality of service transmissions in a wireless communication system, comprising:
a receiver for receiving requests for data flows to transmit data;
a computing platform for assigning a credit value to a data flow respectively for each user equipment (UE) of a population of user equipment (UE);
a transmitter for scheduling each data flow having data to transmit based upon the assigned credit values;
the computing platform further reducing the credit value for each scheduled user equipment (UE) and increasing the credit value for each unscheduled user equipment (UE) having a respective data flow with no data to transmit, wherein the computing platform is further for assigning a quality-of-service weight to the data flow for each user equipment (UE) and for assigning the credit value initially to each data flow based upon a total quality-of-service weights; and further wherein the computing platform is further for allocating to the credit value for a subsequent system slot or time quanta for a scheduled data flow in proportion to the quality-of-service weight in relation to a sum of weights of other scheduled data flows.

31. An apparatus for scheduling quality of service transmissions in a wireless communication system, comprising:
a receiver for receiving requests for data flows to transmit data;
a computing platform for assigning a credit value to a data flow respectively for each user equipment (UE) of a population of user equipment (UE);
a transmitter for scheduling each data flow having data to transmit based upon the assigned credit values;
the computing platform further reducing the credit value for each scheduled user equipment (UE) and increasing the credit value for each unscheduled user equipment (UE) having a respective data flow with no data to transmit, wherein the computing platform is further for assigning a quality-of-service weight to the data flow for each user equipment (UE) and for assigning the credit value initially to each data flow based upon a total quality-of-service weights; and further wherein the computing platform is further for allocating to the credit value for a subsequent system slot or time quanta for an unscheduled data flow in proportion to the quality-of-service weight in relation to a sum of all weights of other scheduled and unscheduled data flows.

32. An apparatus for scheduling quality of service transmissions in a wireless communication system, comprising:
a receiver for receiving requests for data flows to transmit data;
a computing platform for assigning a credit value to a data flow respectively for each user equipment (UE) of a population of user equipment (UE);
a transmitter for scheduling each data flow having data to transmit based upon the assigned credit values;
the computing platform further reducing the credit value for each scheduled user equipment (UE) and increasing the credit value for each unscheduled user equipment (UE) having a respective data flow with no data to transmit, wherein the computing platform is further for assigning a quality-of-service weight to the data flow for each user equipment (UE) and for assigning the credit value initially to each data flow based upon a total quality-of-service weights; and further wherein the computing platform is further for assigning the credit value initially based upon the quality-of-service weights in relation to a total of weights of scheduled data flows.

33. An apparatus for scheduling quality of service transmissions in a wireless communication system, comprising:
a receiver for receiving requests for data flows to transmit data;
a computing platform for assigning a credit value to a data flow respectively for each user equipment (UE) of a population of user equipment (UE);
a transmitter for scheduling each data flow having data to transmit based upon the assigned credit values;
the computing platform further reducing the credit value for each scheduled user equipment (UE) and increasing the credit value for each unscheduled user equipment (UE) having a respective data flow with no data to transmit, wherein the transmitter is further for scheduling a data flow to transmit data having a size that will reduce the credit value corresponding to the data flow below zero.

34. An apparatus for scheduling quality of service transmissions in a wireless communication system, comprising:
a receiver for receiving requests for data flows to transmit data;
a computing platform for assigning a credit value to a data flow respectively for each user equipment (UE) of a population of user equipment (UE);
a transmitter for scheduling each data flow having data to transmit based upon the assigned credit values;

the computing platform further reducing the credit value for each scheduled user equipment (UE) and increasing the credit value for each unscheduled user equipment (UE) having a respective data flow with no data to transmit, wherein the transmitter is further for scheduling a data flow to transmit data having a size that will reduce the credit value corresponding to the data flow below zero, wherein the transmitter is further for scheduling a data flow to consume a full medium access control (MAC) slot or quanta as a minimum radio link protocol (RLP) framing rule.

35. An apparatus for scheduling quality of service transmissions in a wireless communication system, comprising:
a receiver for receiving requests for data flows to transmit data;
a computing platform for assigning a credit value to a data flow respectively for each user equipment (UE) of a population of user equipment (UE);
a transmitter for scheduling each data flow having data to transmit based upon the assigned credit values;
the computing platform further reducing the credit value for each scheduled user equipment (UE) and increasing the credit value for each unscheduled user equipment (UE) having a respective data flow with no data to transmit, wherein the transmitter is further for scheduling a data flow to transmit data having a size that will reduce the credit value corresponding to the data flow below zero, wherein the computing platform is further for increasing the credit value for user equipment (UE) having a credit value below zero at a rate higher than increases for an unscheduled user equipment (UE) having a credit value above zero.

36. An apparatus for scheduling quality of service transmissions in a wireless communication system, comprising:
a receiver for receiving requests for data flows to transmit data;
a computing platform for assigning a credit value to a data flow respectively for each user equipment (UE) of a population of user equipment (UE);
a transmitter for scheduling each data flow having data to transmit based upon the assigned credit values;
the computing platform further reducing the credit value for each scheduled user equipment (UE) and increasing the credit value for each unscheduled user equipment (UE) having a respective data flow with no data to transmit, wherein the transmitter is further for scheduling a data flow to transmit data having a size that will reduce the credit value corresponding to the data flow below zero, wherein the computing platform is further for increasing the credit value for user equipment (UE) having a credit value below zero at a rate higher than increases for an unscheduled user equipment (UE) having a credit value above zero, and further wherein the computing platform is further for increasing the credit value for user equipment (UE) having a credit value below zero by increasing the credit value to zero after a predefined period of time.

37. An apparatus for scheduling quality of service transmissions in a wireless communication system, comprising:
a receiver for receiving requests for data flows to transmit data;
a computing platform for assigning a credit value to a data flow respectively for each user equipment (UE) of a population of user equipment (UE);
a transmitter for scheduling each data flow having data to transmit based upon the assigned credit values;
the computing platform further reducing the credit value for each scheduled user equipment (UE) and increasing the credit value for each unscheduled user equipment (UE) having a respective data flow with no data to transmit, wherein the transmitter is further for scheduling a data flow to transmit data having a size that will reduce the credit value corresponding to the data flow below zero, wherein the computing platform is further for increasing the credit value for user equipment (UE) having a credit value below zero at a rate higher than increases for an unscheduled user equipment (UE) having a credit value above zero, and further wherein the computing platform is further for increasing the credit value for user equipment (UE) having a credit value below zero by increasing the credit value by a geometric factor.

38. An apparatus for scheduling quality of service transmissions in a wireless communication system, comprising:
a receiver for receiving requests for data flows to transmit data;
a computing platform for assigning a credit value to a data flow respectively for each user equipment (UE) of a population of user equipment (UE);
a transmitter for scheduling each data flow having data to transmit based upon the assigned credit values;
the computing platform further reducing the credit value for each scheduled user equipment (UE) and increasing the credit value for each unscheduled user equipment (UE) having a respective data flow with no data to transmit, wherein the transmitter is further for scheduling a data flow to transmit data having a size that will reduce the credit value corresponding to the data flow below zero, wherein the computing platform is further for increasing the credit value for user equipment (UE) having a credit value below zero at a rate higher than increases for an unscheduled user equipment (UE) having a credit value above zero, wherein the computing platform is further for increasing the credit value for user equipment (UE) having a credit value below zero by increasing the credit value by a polynomial factor.

39. An apparatus for scheduling quality of service transmissions in a wireless communication system, comprising:
a receiver for receiving requests for data flows to transmit data;
a computing platform for assigning a credit value to a data flow respectively for each user equipment (UE) of a population of user equipment (UE);
a transmitter for scheduling each data flow having data to transmit based upon the assigned credit values; and
the computing platform further for reducing the credit value for each scheduled user equipment (UE) and increasing the credit value for each unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system, wherein the transmitter is further for scheduling each data flow having data based on a larger credit value preceding a smaller credit value as a priority-driven rule.

40. An apparatus for scheduling quality of service transmissions in a wireless communication system, comprising:
a receiver for receiving requests for data flows to transmit data;
a computing platform for assigning a credit value to a data flow respectively for each user equipment (UE) of a population of user equipment (UE);

a transmitter for scheduling each data flow having data to transmit based upon the assigned credit values; and the computing platform further for reducing the credit value for each scheduled user equipment (UE) and increasing the credit value for each unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system, wherein the transmitter is further for excluding scheduling of any data flow having a credit value below a credit threshold as a deficit round robin rule.

41. An apparatus for scheduling quality of service transmissions in a wireless communication system, comprising:

a receiver for receiving requests for data flows to transmit data;

a computing platform for assigning a credit value to a data flow respectively for each user equipment (UE) of a population of user equipment (UE);

a transmitter for scheduling each data flow having data to transmit based upon the assigned credit values; and the computing platform further for reducing the credit value for each scheduled user equipment (UE) and increasing the credit value for each unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system, wherein the transmitter is further for excluding scheduling of any data flow having a credit value below a credit threshold as a deficit round robin rule, wherein the credit threshold is zero.

42. An apparatus for scheduling quality of service transmissions in a wireless communication system, comprising:

a receiver for receiving requests for data flows to transmit data;

a computing platform for assigning a credit value to a data flow respectively for each user equipment (UE) of a population of user equipment (UE);

a transmitter for scheduling each data flow having data to transmit based upon the assigned credit values; and the computing platform further for reducing the credit value for each scheduled user equipment (UE) and increasing the credit value for each unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system, wherein the computing platform is further for assigning the credit value statically by a central administrator.

43. An apparatus for scheduling quality of service transmissions in a wireless communication system, comprising:

a receiver for receiving requests for data flows to transmit data;

a computing platform for assigning a credit value to a data flow respectively for each user equipment (UE) of a population of user equipment (UE);

a transmitter for scheduling each data flow having data to transmit based upon the assigned credit values; and the computing platform further for reducing the credit value for each scheduled user equipment (UE) and increasing the credit value for each unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system, wherein the receiver is further for recognizing each data flow by a selected one of a group consisting of upon source port, destination port, source address, destination address, and Internet Protocol (IP) Type of Service (TOS) field.

44. An apparatus for scheduling quality of service transmissions in a wireless communication system, comprising:

a receiver for receiving requests for data flows to transmit data;

a computing platform for assigning a credit value to a data flow respectively for each user equipment (UE) of a population of user equipment (UE);

a transmitter for scheduling each data flow having data to transmit based upon the assigned credit values; and the computing platform further for reducing the credit value for each scheduled user equipment (UE) and increasing the credit value for each unscheduled user equipment (UE) having a respective data flow with no data to transmit, wherein the credit value for an unscheduled user equipment (UE) having a respective data flow with no data to transmit is a burst credit based on a share of all credits that would be allocated in a fully busy system, wherein the computing platform is further for assigning credits in units of medium access control (MAC) slot capacity.

* * * * *